(12) United States Patent
Nishimura et al.

(10) Patent No.: US 12,340,919 B2
(45) Date of Patent: Jun. 24, 2025

(54) SILVER PASTE (71) Applicant: SHOEI CHEMICAL INC., Tokyo (JP)

(72) Inventors: Kousuke Nishimura, Tosu (JP); Naoto Shindo, Tosu (JP); Hiroshi Mashima, Tosu (JP)

(73) Assignee: SHOEI CHEMICAL INC., Tokyo (JP)

(*) Notice: Subject to any disclaimer, the term of this patent is extended or adjusted under 35 U.S.C. 154(b) by 644 days.

(21) Appl. No.: 17/417,885

(22) PCT Filed: Nov. 28, 2019

(86) PCT No.: PCT/JP2019/046480
§ 371 (c)(1),
(2) Date: Jun. 24, 2021

(87) PCT Pub. No.: WO2020/137329
PCT Pub. Date: Jul. 2, 2020

(65) Prior Publication Data
US 2022/0072607 A1 Mar. 10, 2022

(30) Foreign Application Priority Data
Dec. 26, 2018 (JP) .................. 2018-242805

(51) Int. Cl.
B22F 1/107 (2022.01)
B22F 1/00 (2022.01)
(Continued)

(52) U.S. Cl.
CPC .............. *H01B 1/22* (2013.01); *B22F 1/00* (2013.01); *B22F 1/05* (2022.01); *B22F 1/052* (2022.01);
(Continued)

(58) Field of Classification Search
CPC ..... H01B 1/22; H01B 1/02; B22F 1/00; B22F 1/05; B22F 1/052; B22F 1/06;
(Continued)

(56) References Cited

U.S. PATENT DOCUMENTS

| 8,242,201 B2 * | 8/2012 | Goto ................ C09D 11/322 |
| | | 524/549 |
| 10,529,873 B2 * | 1/2020 | Zhu .................... C08L 1/02 |

(Continued)

FOREIGN PATENT DOCUMENTS

| JP | 10102108 A | 4/1998 |
| JP | 2003280179 A | 10/2003 |

(Continued)

OTHER PUBLICATIONS

Kawashima, JP2018055819-MT (Year: 2018).*
(Continued)

Primary Examiner — Robert S Jones, Jr.
Assistant Examiner — Zhen Liu
(74) Attorney, Agent, or Firm — Alleman Hall & Tuttle LLP (57) ABSTRACT The present invention provides a silver paste containing at least a silver powder, a binder resin, and an organic solvent, in which a value $C_{BND}/S_{BET}$ is 2.0 to 3.4 where $S_{BET}$ (m²/g) represents a specific surface area of the silver powder, and $C_{BND}$ (% by mass) represents a content percentage of the binder resin based on the silver powder, a copper content of the silver powder is 10 to 5000 ppm by mass, and the silver paste has a dry film density of 7.50 g/cm³ or more. The present invention can provide a silver paste containing a powder in a high concentration and excellent in printability, and accordingly provide a silver conductor film that has a (Continued)

high filling factor and a high film density, exhibits high electrical conductivity, and is excellent in migration resistance.

10 Claims, 2 Drawing Sheets

(51) Int. Cl.
*B22F 1/05* (2022.01)
*B22F 1/052* (2022.01)
*B22F 1/06* (2022.01)
*B22F 1/102* (2022.01)
*B22F 1/103* (2022.01)
*C08K 3/08* (2006.01)
*H01B 1/22* (2006.01)
*H01F 27/29* (2006.01)

(52) U.S. Cl.
CPC .............. *B22F 1/06* (2022.01); *B22F 1/102* (2022.01); *B22F 1/103* (2022.01); *B22F 1/107* (2022.01); *C08K 3/08* (2013.01); *H01F 27/29* (2013.01); *B22F 2301/255* (2013.01); *C08K 2003/0806* (2013.01)

(58) Field of Classification Search
CPC .......... B22F 1/102; B22F 1/103; B22F 1/107; B22F 2301/255; B22F 2998/10; B22F 2999/00; C08K 3/08; C08K 2003/0806; H01F 27/29; H01F 17/0013; H01F 27/292; H01F 17/00; C22C 5/06; H01G 4/30

See application file for complete search history.

(56) References Cited

U.S. PATENT DOCUMENTS

| | | | |
|---|---|---|---|
| 2009/0107707 A1* | 4/2009 | Yamakawa | ............ H05K 1/092 252/514 |
| 2017/0129058 A1* | 5/2017 | Yoshii | ...................... H01B 1/22 |
| 2020/0238388 A1* | 7/2020 | Michiaki | ................. B22F 9/082 |

FOREIGN PATENT DOCUMENTS

| | | |
|---|---|---|
| JP | 2004220807 A | 8/2004 |
| JP | 2005174824 A | 6/2005 |
| JP | 2005203304 A | 7/2005 |
| JP | 2006111903 A | 4/2006 |
| JP | 2007131950 A | 5/2007 |
| JP | 2008192565 A | 8/2008 |
| JP | 2011021271 A | 2/2011 |
| JP | 2013543061 A | 11/2013 |
| JP | 2014197483 A | 10/2014 |
| JP | 2015078437 A | 4/2015 |
| JP | 5847516 B2 * | 1/2016 |
| JP | 2017043840 A | 3/2017 |
| JP | 2017082327 A | 5/2017 |
| JP | 2018055819 A * | 4/2018 |
| JP | 2018055883 A | 4/2018 |
| KR | 1020080009684 A | 1/2008 |
| KR | 101710196 B | 2/2017 |
| WO | 2014061765 A1 | 4/2014 |
| WO | 2019065341 A1 | 4/2019 |

OTHER PUBLICATIONS

Hirota, JP5847516-MT (Year: 2016).*
Japan Patent Office, Office Action Issued in Application No. 2020562962, Sep. 26, 2023, 9 pages.
Japan Patent Office, Office Action Issued in Application No. 2020-562962, Apr. 9, 2024, 10 pages.
Korean Intellectual Property Office, Office Action Issued in Application No. 10-2021-7022741, Mar. 26, 2025, 14 pages.

* cited by examiner

SILVER PASTE

TECHNICAL FIELD

The present invention relates to a baked silver paste that contains a silver powder, and is used for forming an internal electrode or an external electrode included in a ceramic electronic component such as a multilayer ceramic capacitor, an inductor, or an actuator.

BACKGROUND ART

An electrically conductive paste containing a metal powder to be used for forming an internal electrode or an external electrode of an electronic component has been conventionally widely used. One of the reasons is that an electrically conductive paste containing a metal powder is applicable to various printing methods such as a screen printing method, an offset printing method, a gravure printing method, an inkjet method, a dipping method, a dispensing method, a brush coating method, and a spin coating method, and can form a thick film by performing coating printing once, and hence is advantageous for obtaining a high electrical conductivity as compared with, for example, an electrically conductive ink using an organic metal compound, or the like.

Besides, in order to obtain a high electrical conductivity, a content of the metal powder contained in the electrically conductive paste is preferably higher, and a coating film obtained by printing the paste is required to be dense and have a high density. When the content of the metal powder is high, definite conductivity can be obtained even in pattern formation further refined in the future.

For example, Patent Literature 1 (Japanese Patent Laid-Open No. 2005-174824) discloses the following invention: A metal colloidal particle is used instead of a metal powder for obtaining a highly dense and a highly conductive film, and an organic metal compound is used together to fill a gap between the metal colloidal particles with the organic metal compound, and thus, denseness is increased.

The metal colloidal particle and the organic metal compound contain a large amount of organic components, however, and therefore, if these are used as principal conductive components, a content of a metal component is lower than in a paste using a metal powder, and hence a conductor film with a low specific resistance cannot be obtained. In addition, it is difficult to apply to the above-described various printing methods, and if a large amount of a binder resin, such as a viscosity modifier or the like, is added to the paste for solving this problem, a metal ratio in a resultant coating film is further reduced.

Meanwhile, when a metal powder is used as an electrically conductive component of a paste, a conductor film having a low specific resistance can be obtained if the content of the metal powder is high, but printability is deteriorated as the content of the metal powder is higher. Therefore, in a silver paste, for example, a coating film density described in Patent Literature 2 is 5.4 g/cm³ at the most, and a coating film density described in Patent Literature 3 is about 5.70 g/cm³ at the most. Besides, Patent Literature 4 discloses an example of a nickel paste having a dry film density of 6.2 g/cm³.

In an electrically conductive paste, when a dense coating film is obtained for attaining a high electrical conductivity, printability is sacrificed as in these techniques, and thus, there is a trade-off (antinomic) relationship therebetween. Therefore, there is a demand for an electrically conductive paste capable of simultaneously attaining dense coating film formation and good printability.

There are known cases where two types of silver powders having different particle sizes, that is large and small sizes, are used for obtaining a dense coating film (Patent Literature 5 and Patent Literature 6). However, in particular, in a silver paste using a silver powder, a phenomenon designated as migration is known, and as the amount of the silver powder having a small size (of, for example, less than 0.5 μm) contained in the silver paste is larger, migration more easily occurs.

In order to inhibit the migration, various attempts have been conventionally made by addition of a migration inhibitor containing fluorine to a silver paste (Patent Literature 7), and addition of a mixed powder, an alloy powder, a compound powder or the like containing three elements of copper, tin and manganese to a silver powder (Patent Literature 8).

CITATION LIST

Patent Literature

[0010][Patent Literature 1] Japanese Patent Laid-Open No. 2005-174824

[Patent Literature 2] Japanese Patent Laid-Open No. 2007-131950

[Patent Literature 3] Japanese Patent Laid-Open No. 2008-192565

[Patent Literature 4] Japanese Patent Laid-Open No. 2004-220807

[Patent Literature 5] Japanese Patent Laid-Open No. 2003-280179

[Patent Literature 6] Japanese Patent Laid-Open No. 2005-203304

[Patent Literature 7] Japanese Patent Laid-Open No. 2014-197483

[Patent Literature 8] International Publication No. WO2014/061765

SUMMARY OF INVENTION

Technical Problem

It is, however, not preferable for obtaining high electrical conductivity to add a large amount of a component different from a silver powder to a paste as described above for purpose of preventing migration.

Accordingly, an object of the present invention is to solve these problems. Specifically, an object of the present invention is to provide a silver paste that contains a silver powder in a high concentration and is excellent in printability, and to accordingly provide a silver conductor film that has a high filling factor and a high film density, exhibits high electrical conductivity, and is excellent in migration resistance.

Solution to Problem

As a result of earnest studies made for solving the above-described problems, the present inventors found the following: Even when a silver powder is contained in a paste in a high concentration, a dense dry film can be obtained without sacrificing printability by controlling a specific surface area of the silver powder and a solid component of a binder resin in specific ranges. In addition, migration can be effectively inhibited by causing a minimum necessary amount of a copper component to be contained in the silver powder. Thus, the present invention was accomplished.

Specifically, a present invention (1) provides a silver paste, containing at least a silver powder, a binder resin, and an organic solvent, in which a value $C_{BND}/S_{BET}$ is 2.00 to 3.40, where $S_{BET}$ (m²/g) represents a specific surface area of the silver powder, and $C_{BND}$ (% by mass) represents a content percentage of the binder resin based on the silver powder, a copper content of the silver powder is 10 to 5000 ppm by mass, and the silver paste has a dry film density of 7.50 g/cm³ or more.

A present invention (2) provides the silver paste according to (1), in which the dry film density is 7.60 g/cm³ or more.

A present invention (3) provides the silver paste according to (1) or (2), in which the value $C_{BND}/S_{BET}$ is 2.50 to 3.10.

A present invention (4) provides the silver paste according to any one of (1) to (3), in which the silver powder contains copper in a content of 30 to 500 ppm by mass.

A present invention (5) provides the silver paste according to any one of (1) to (4), in which a content $C_{AG}$ of the silver powder based on the silver paste is 80.00 to 97.00% by mass.

A present invention (6) provides the silver paste according to (5), in which the content $C_{AG}$ of the silver powder based on the silver paste is 92.00 to 96.00% by mass.

A present invention (7) provides the silver paste according to any one of (1) to (6), in which the specific surface area $S_{BET}$ of the silver powder is 0.10 to 0.30 m²/g.

A present invention (8) provides the silver paste according to any one of (1) to (7), in which D10 is 1.00 to 3.00 μm and D50 is 3.00 to 7.00 μm, where D10 and D50 respectively represent a 10% value and a 50% value of a volume-based cumulative fraction obtained by laser diffraction particle size distribution measurement of the silver powder.

A present invention (9) provides the silver paste according to (8), in which the D10 is 1.20 to 2.00 μm.

A present invention (10) provides the silver paste according to (8) or (9), in which the D50 is 3.90 to 5.00 μm.

A present invention (12) provides the silver paste according to any one of (1) to (10), to be used for forming a conductor film by a heat treatment at 700° C. or less.

Advantageous Effects of Invention

The present invention can provide a silver paste that contains a silver powder in a high concentration and is excellent in printability, and accordingly provide a silver conductor film that has a high filling factor and a high film density, exhibits high electrical conductivity, and is excellent in migration resistance.

DESCRIPTION OF EMBODIMENT

A silver paste of the present invention is a silver paste containing at least a silver powder, a binder resin, and an organic solvent, in which a value $C_{BND}/S_{BET}$ is 2.00 to 3.40 where $S_{BET}$ (m²/g) represents a specific surface area of the silver powder, and $C_{BND}$(% by mass) represents a content percentage of the binder resin based on the silver powder, a copper content of the silver powder is 10 to 5000 ppm by mass, and the silver paste has a dry film density of 7.50 g/cm³ or more.

The silver paste of the present invention contains at least a silver powder, a binder resin, and an organic solvent.

The silver powder used in the silver paste of the present invention, namely, the silver powder contained in the silver paste of the present invention, is not especially limited in the shape, the particle size, the production method, and the like as long as requirements described below can be met.

The copper content of the silver powder used in the silver paste of the present invention is 10 to 5000 ppm by mass, and preferably 30 to 500 ppm by mass. When the copper content of the silver powder falls in this range, migration is difficult to occur. In contrast, when the copper content of the silver powder is less than the range, migration easily occurs. From the viewpoint of migration resistance, there is no upper limit in the copper content, but when the copper content is over the range, a specific resistance is increased. Therefore, the copper content of the silver powder in the present invention is within a range of 10 to 5000 ppm by mass. It is noted that the term "to" used herein to indicate a numerical range indicates a range including values preceding and following the term "to" unless otherwise stated. Specifically, for example, a notation "10 to 5000" has the same meaning as "10 or more and 5000 or less" unless otherwise stated.

The binder resin used in the silver paste of the present invention is not especially limited, and can be a binder resin used in a usual silver paste. Examples of the binder resin include celluloses, acrylic resins, phenol resins, epoxy resins, urethane resins, polyester resins and polyethylene resins.

The organic solvent used in the silver paste of the present invention is not especially limited, and can be an organic solvent used in a usual silver paste. Examples of the organic solvent include alcohol-based, ether-based, ester-based, and hydrocarbon-based organic solvents, water, and mixed solvents of these.

The value "$C_{BND}/S_{BET}$" of the silver paste of the present invention is 2.00 to 3.40, and preferably 2.50 to 3.10, where $S_{BET}$(m²/g) represents the specific surface area of the silver powder and $C_{BND}$ (% by mass) represents the content percentage of the binder resin based on the silver powder. When the value $C_{BND}/S_{BET}$ falls in this range, good printability is obtained, and in addition, the silver content of the silver paste can be increased, and as a result, a conductive film having a high dry film density, and high denseness and electrical conductivity can be obtained. In contrast, when the value $C_{BND}/S_{BET}$ is less than the range, since the amount of the binder resin covering the surface of silver is short, dispersibility of a silver particle in the silver paste is deteriorated or strength of a dry film is lowered. Therefore, in employing, for example, screen printing, a release property of a screen becomes poor, or the shape of a coating film is difficult to retain after printing and drying. Besides, when the value $C_{BND}/S_{BET}$ is over the range, a large amount of an organic solvent is unavoidably used for retaining appropriate printability. Therefore, a dry film density is lowered because the silver content of the silver paste is reduced, and hence denseness and electrical conductivity are deteriorated. The $S_{BET}$ (m²/g) refers to a specific surface area obtained by a BET method with helium gas adsorbed onto a surface of the silver powder. The $C_{BND}$ (% by mass) refers to a content percentage (% by mass) of the binder resin based on the silver powder obtained in accordance with an equation "(content of binder resin in silver paste/content of silver powder in silver paste)×100".

The dry film density of the silver paste of the present invention is 7.50 g/cm³ or more. A lower limit of the dry film density of the silver paste of the present invention is preferably 7.60 g/cm³, and particularly preferably 7.80 g/cm³. An upper limit of the dry film density of the silver paste of the present invention is preferably as high as possible as long as printability is good, but does not exceed a density of silver (10.5 g/cm³), and in consideration of workability, productivity, and the like, the upper limit is about 8.50 g/cm³ in reality. As a method for controlling the dry film density, the dry film density can be controlled by a widely known general method, and can be controlled by, for example, adjusting a particle size distribution or a surface state (such as smoothness, and whether surface-treated or not) of the silver powder, by changing the binder resin, the organic solvent or the like to be used, or if a dispersant is added to the paste, by changing the type or the amount of the dispersant to be added. In the present invention, the dry film density refers to a density of a dry film obtained by drying a coating film of the silver paste as it is without compression. In an example described later, a silver paste to be measured is applied on a PET (polyethylene terephthalate) film in a thickness of about 150 μm, the resultant is temporarily dried at 80° C. for 10 minutes, and then the resultant paste together with the PET film is punched into a circular shape with a diameter of 15 mm, the resultant is finally dried at 150° C. for 1 hour, and then the PET film is peeled. A mass W and a volume V of the thus obtained dry film are measured to calculate a value W/V as the dry film density.

In the silver paste of the present invention, when the value $C_{BND}/S_{BET}$ and the copper content of the silver powder respectively satisfy the above-described ranges, and the dry film density falls in the above-described range, a dense and highly electrically conductive film can be obtained. Thus, the silver paste of the present invention can form a dense conductor film having a low specific resistance, whereas a conductor film also excellent in printability and excellent in coating film shape can be obtained, and in addition, excellent migration resistance can be obtained and occurrence of a short circuit between conductor films can be reduced. In an experimental example described below, the silver paste of the present invention is screen printed on a substrate to be printed, and the coating film shape (printing pattern) is evaluated to be preferable and printability is evaluated to be good as a value of a contact angle (rectangularity) between the substrate and the coating film is closer to 90°.

When the silver content of the silver paste is higher, a film with higher electrical conductivity can be obtained, but when the silver content is too high, printability is deteriorated. The content $C_{AG}$ of the silver powder based on the silver paste of the present invention is preferably 80.00 to 97.00% by mass, and particularly preferably 92.00 to 96.00% by mass from the viewpoint that both electrical conductivity and printability can be increased. The silver content (% by mass) of the silver paste refers to a content percentage of the silver powder based on the silver paste obtained in accordance with an equation "(content of silver powder/mass of silver paste)×100".

The specific surface area $S_{BET}$ of the silver powder used in the silver paste of the present invention is preferably 0.10 to 0.30 m²/g. When the specific surface area $S_{BET}$ of the silver powder is 0.10 to 0.30 m²/g, since the content of a silver powder having a small diameter in which migration easily occurs is small, a short circuit between conductor films is more effectively inhibited. The specific surface area $S_{BET}$ of the silver powder is particularly preferably 0.12 to 0.20 m²/g. The shape of the silver powder may be a granular shape, a flake shape, or an indeterminate shape, and is particularly preferably a spherical shape. In the present invention, the spherical shape refers to a powder in which an average of aspect ratios of arbitrary fifty particles found in the visual field through observation with an SEM (scanning electron microscope) is in a range of 1.0 to 1.5. In the present invention, the average of the aspect ratios is particularly preferably in a range of 1.0 to 1.3.

As the silver powder used in the silver paste of the present invention, a silver powder having a D10 of 1.00 to 3.00 μm and a D50 of 3.00 to 7.00 μm is preferred, and furthermore, the D10 of the silver powder is particularly preferably 1.20 to 2.00 μm, and the D50 of the silver powder is particularly preferably 3.90 to 5.00 μm. When the D10 and D50 of the silver powder meet the above-described requirements, the dry film density is increased, and in addition, the content of a silver powder having a small diameter in which migration easily occurs is small, and therefore, a short circuit between conductor films is more effectively inhibited.

The silver powder used in the silver paste of the present invention is preferably a mixed powder obtained by mixing two or more types of silver powders having different average particle sizes (D50). When a mixed powder containing two or more types of silver powders having different average particle sizes (D50) is used as the silver powder, a dense and highly electrically conductive conductor film having a high dry film density can be easily obtained.

The silver powder used in the silver paste of the present invention is preferably a mixed powder containing: (a) a first silver powder having a D50 of 3.50 to 7.50 μm, preferably 3.70 to 7.50 μm, and particularly preferably 4.00 to 6.00 μm, and (b) a second silver powder having a D50 that is 0.80 to 2.70 μm, may be 0.80 to 2.00 μm, and is preferably in a range of 0.80 to 1.80 μm. In this case, the above-described various physical property values such as the specific surface area $S_{BET}$, the D50 and D10, and the copper content may fall respectively in the above-described numerical ranges as the whole mixed powder obtained by mixing the two or more silver powders. Since a value of the D10 of the whole mixed powder is easily lowered by the second silver powder, the second silver powder having a D10 adjusted to 0.70 μm or more is preferably used.

In the present invention, a production method for the silver powder is not especially limited, and the silver powder can be produced by, for example, conventionally known atomization method, wet reduction method and chemical vapor deposition (CVD) method, a physical vapor deposition (PVD) method as described in Japanese Patent No. 3541939, a spray pyrolysis method as described in Japanese Patent Publication No. 63-31522, a "method for pyrolyzing a pyrolytic metal-containing compound in a gas phase" as described in Japanese Patent No. 3812359, or the like. Among these methods, the PVD method, the spray pyrolysis method, and a production method by the "method for pyrolyzing a pyrolytic metal-containing compound in a gas phase" are preferred because a silver powder that is spherical, has a high crystallinity, and contains particles of uniform sizes can be easily obtained.

In the silver paste of the present invention, the content percentage $C_{BDN}$ of the binder resin based on the silver powder is preferably 0.430 to 0.750% by mass, and particularly preferably 0.440 to 0.600% by mass.

The silver paste of the present invention can appropriately contain, if necessary, an inorganic compound such as a glass frit or a metal oxide, and a plasticizer, a viscosity modifier, a surfactant, a dispersant, an oxidant or the like used as additives in a usual silver paste.

The silver paste of the present invention can be produced in accordance with a usual method by kneading and homogeneously dispersing the silver powder, the binder resin, the organic solvent, and an organic oxide, an additive and the like appropriately added if necessary, and then preparing the resultant into a paste rheology applicable to screen printing and other printing methods.

The silver paste of the present invention is used for forming an internal electrode, an external electrode, or a thick film conductor circuit included in an electronic component such as a multilayer ceramic capacitor, an inductor, or an actuator. In particular, the silver paste of the present invention is suitably used for forming an internal electrode of a multilayer inductor using, as a magnetic material, a dust core material, particularly a soft magnetic metal particle.

The term "printability" used herein will now be described to be more easily understood by exemplifying a multilayer inductor.

Figure 1:
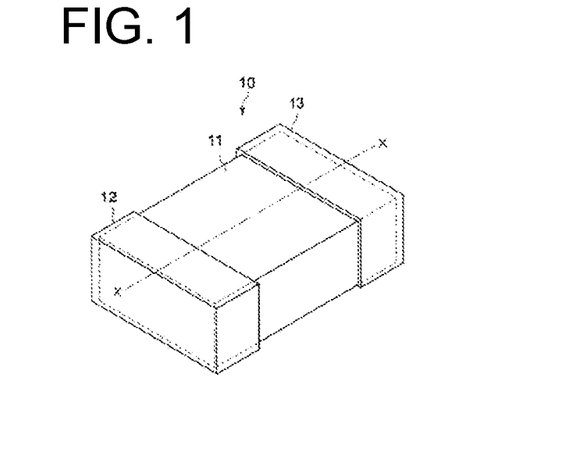
FIG. 1 is an external view of a multilayer inductor.

Usually, a multilayer inductor 10 includes, as in an example illustrated in FIG. 1, a base body 11, and a first external electrode 12 and a second external electrode 13 respectively covering a pair of end surfaces of the base body 11.

Figure 2:
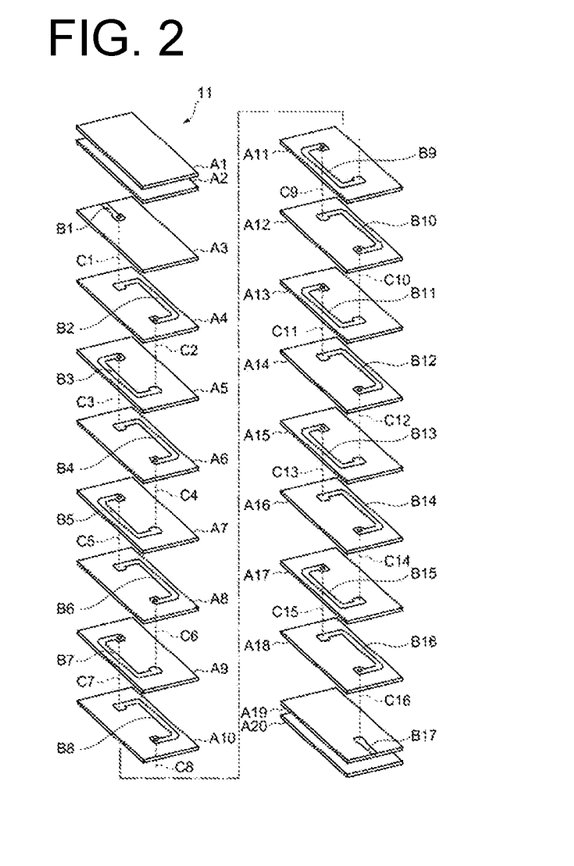
FIG. 2 is an exploded view of a base body portion of the multilayer inductor.

The base body 11 includes, as illustrated in FIG. 2, magnetic layers A1 to A20 and internal electrode layers B1 to B17 stacked on one another. Each of the magnetic layers A1 to A20 is obtained by preparing a magnetic paste by kneading, with an appropriate binder resin and an organic solvent, a core-shell composite particle (which is obtained by coating a surface of, for example, a soft magnetic iron alloy particle containing iron as a principal component with an insulating film of a resin, an oxide film or the like), forming the magnetic paste into a sheet shape, and drying the resultant. On the magnetic layers A3 to A19, the internal electrode layers B1 to B17 respectively in prescribed patterns are formed by a screen printing method. The silver paste of the present invention is used for forming these internal electrode layers. One end of the internal electrode layer B1 is exposed on an end surface of the magnetic layer A3 to be electrically connected to the external electrode 12, and one end of the internal electrode layer B17 is similarly electrically connected to the external electrode 13. The internal electrode layers B1 to B17 are electrically connected to one another via through-hole electrodes C1 to C16 formed through a thickness direction of the magnetic layers A3 to A19, and thus, the internal electrode layers B1 to B17 are formed as a whole in a coil shape in a stacking direction. In forming the internal electrode layers B1 to B17 on the magnetic layers A3 to A19, magnetic layers (not shown) in a shape capable of filling level differences caused by the thicknesses of the internal electrode layers B1 to B17 are preferably further stacked on the magnetic layers A3 to A19. The base body 11 including the magnetic layers A1 to A20 and the internal electrode layers B1 to B17 stacked on one another is baked at about 700° C. through thermocompression bonding, and then, the external electrodes 11 and 12 are formed in the pair of end portions, and thus, the multilayer inductor is obtained. Here, the external electrodes may be formed with the silver paste of the present invention, or may be formed with a conductive paste containing nickel or copper as a principal component.

Figure 3:
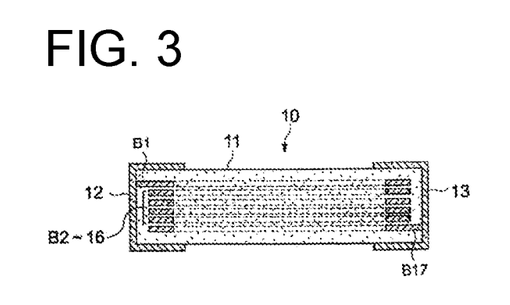
FIG. 3 is a schematic cross-sectional view taken along line X-X of FIG. 1.
Figure 4:
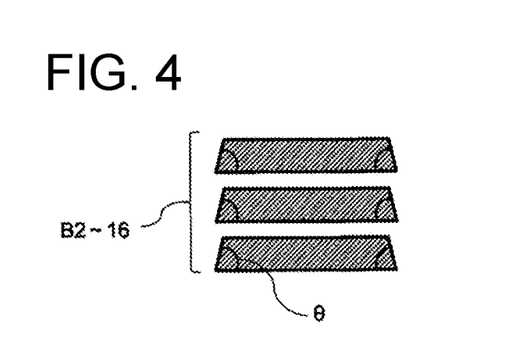
FIG. 4 is an enlarged schematic view of a part of FIG. 3.

The multilayer inductor of FIG. 1 thus produced has a cross-section taken along line X-X as illustrated in FIG. 3, and a part of the cross-section is illustrated in an enlarged view in FIG. 4. It is noted that both FIGS. 3 and 4 are schematic diagrams, and hence do not always accord with the contents and structure illustrated in FIG. 2 including the number of stacked layers. As illustrated in FIG. 3, the cross-sectional shape of each internal electrode layer is required to be ideally rectangular. Actually, however, the viscosity/flowability and the like of the paste affects in coating printing the silver paste on the substrate, and hence, the actual cross-sectional shape of each internal electrode layer is usually in a substantially trapezoidal shape as illustrated in FIG. 4. In order to make this shape to be closer to a rectangular shape, a paste having a property that the flowability is high in printing but viscosity is rapidly increased after the printing may be used. There are, however, a very large number of parameters to be controlled in a paste, and these parameters complicatedly affect one another, and hence, it is not too much to say that there is no case where expected results and properties can be obtained.

In this manner, the term "printability" herein means not only that printing can be performed with appropriate flowability in printing process by a screen printing method, a gravure printing method or the like but also that a high viscosity is rapidly exhibited after the printing to obtain a coating film (conductor film) in a shape closer to a rectangular shape.

The silver paste of the present invention is suitably used as a baked silver paste used for forming an internal electrode or an external electrode in a ceramic electronic component such as a multilayer ceramic capacitor, an inductor, or an actuator. The silver paste of the present invention is used, for example, for forming a conductor film by a heat treatment at 700° C. or less.

Now, the present invention will be described on the basis of specific experimental examples, and it is noted that the present invention is not limited to these examples.

EXAMPLES

<Production of Silver Powder>

First, silver powders 1 to 21 shown in Table 1 were prepared in accordance with the spray pyrolysis method described in Japanese Patent Publication No. 63-31522. Specifically, for each of the silver powders 6, 8, 13 to 17, and 19 to 21, an aqueous solution, which was obtained by dissolving silver salt and copper salt weighed so that a copper content of a resultant silver powder could be a value shown in a column of Whole Silver Powder of Table 1, was spray pyrolyzed, and the thus collected silver powder was subjected to a classification treatment to adjust values of D10 and D50. On the other hand, for the silver powders 1 to 5, 7, 9 to 12 and 18, an aqueous solution, which was obtained by dissolving silver salt and copper salt weighed so that a copper contained in a resultant silver powder could be a value shown in a column of First Silver Powder or Second Silver Powder of Table 1, was spray pyrolyzed, and the thus collected silver powder was subjected to a classification treatment to adjust values of D10 and D50, and then, the resultant first silver powder and second silver powder were mixed to obtain a mixed powder as the silver powder.

In each of these silver powders, a 10% value (D10) and a 50% value (D50) of a volume-based cumulative fraction were obtained with a laser diffraction particle size distribution measuring apparatus. Besides, a specific surface area ($S_{BET}$) was measured by the BET method, and aspect ratios of fifty silver particles arbitrarily selected through observation of an SEM (scanning electron microscope) image were measured to obtain an average thereof. Results are shown in Table 1.

TABLE 1

| | Whole Silver Powder | | | | | | First Silver Powder | | First Silver Powder/ Whole Silver Powder [wt ratio] | Second Silver Powder | | |
|---|---|---|---|---|---|---|---|---|---|---|---|---|
| Silver Powder No. | D10 (μm) | D50 (μm) | $S_{BET}$ (m²/g) | Aspect Ratio | Cu Content (mass ppm) | Form | D50 (μm) | Cu Content (mass ppm) | | D10 (μm) | D50 (μm) | Cu Content (mass ppm) |
| 1 | 1.32 | 4.01 | 0.20 | 1.0 | 75 | Mixture of Two Silver Powders | 4.51 | 0 | 0.83 | 0.83 | 1.53 | 450 |
| 2 | 1.31 | 4.12 | 0.19 | 1.0 | 60 | Mixture of Two Silver Powders | 4.51 | 0 | 0.87 | 0.79 | 1.43 | 470 |
| 3 | 1.90 | 4.24 | 0.17 | 1.2 | 73 | Mixture of Two Silver Powders | 4.51 | 60 | 0.91 | 0.83 | 1.53 | 200 |
| 4 | 1.25 | 4.09 | 0.19 | 1.1 | 60 | Mixture of Two Silver Powders | 4.51 | 0 | 0.87 | 0.77 | 1.25 | 470 |
| 5 | 1.01 | 3.90 | 0.25 | 1.1 | 60 | Mixture of Two Silver Powders | 4.03 | 0 | 0.96 | 0.71 | 0.88 | 1500 |
| 6 | 2.20 | 4.40 | 0.14 | 1.1 | 50 | One Silver Powder | | | — | | | |
| 7 | 1.15 | 4.05 | 0.20 | 1.0 | 85 | Mixture of Two Silver Powders | 4.35 | 50 | 0.86 | 1.29 | 2.19 | 300 |
| 8 | 1.60 | 4.20 | 0.18 | 1.1 | 1000 | One Silver Powder | | | — | | | |
| 9 | 2.27 | 3.48 | 0.22 | 1.0 | 87 | Mixture of Two Silver Powders | 4.51 | 0 | 0.66 | 0.82 | 1.51 | 250 |
| 10 | 1.91 | 3.00 | 0.27 | 1.0 | 132 | Mixture of Two Silver Powders | 4.51 | 0 | 0.50 | 0.82 | 1.51 | 260 |
| 11 | 0.98 | 4.08 | 0.23 | 1.0 | 60 | Mixture of Two Silver Powders | 4.51 | 0 | 0.88 | 0.62 | 0.98 | 490 |
| 12 | 0.91 | 4.07 | 0.20 | 1.2 | 60 | Mixture of Two Silver Powders | 4.50 | 0 | 0.88 | 0.60 | 0.89 | 500 |
| 13 | 2.95 | 4.51 | 0.12 | 1.1 | 0 | One Silver Powder | | | — | | | |
| 14 | 1.30 | 4.10 | 0.20 | 1.1 | 60 | One Silver Powder | | | — | | | |
| 15 | 1.44 | 4.10 | 0.16 | 1.1 | 0 | One Silver Powder | | | — | | | |
| 16 | 1.06 | 2.30 | 0.33 | 1.0 | 60 | One Silver Powder | | | — | | | |
| 17 | 1.17 | 2.33 | 0.31 | 1.2 | 300 | One Silver Powder | | | — | | | |
| 18 | 0.98 | 4.08 | 0.22 | 1.1 | 60 | Mixture of Two Silver Powders | 4.51 | 50 | 0.89 | 0.50 | 0.74 | 150 |
| 19 | 3.11 | 4.98 | 0.17 | 1.1 | 60 | One Silver Powder | | | — | | | |
| 20 | 2.27 | 3.48 | 0.22 | 1.1 | 87 | One Silver Powder | | | — | | | |
| 21 | 0.65 | 1.06 | 0.4 | 1.1 | 300 | One Silver Powder | | | — | | | |
| 22 | 2.48 | 3.98 | 0.20 | 1.0 | 86 | Mixture of Two Silver Powders | 4.65 | 0 | 0.70 | 1.15 | 2.43 | 288 |

Examples 1 to 13 and Comparative Examples 1 to 9

Each of silver paste samples a to u was produced by using each of the silver powders shown in Table 1 in a content $C_{AG}$ shown in Table 2, ethyl cellulose in a content $C_{BND}$ shown in Table 2, and terpineol (TPO) as the balance, and kneading them.

Next, each of the silver paste samples a to u was applied on a PET film into a size of 20 mm×20 mm×151 μm, the resultant was dried at 80° C. for 10 minutes, was punched with a punch of 15 mmΦ, and was further subjected to a drying treatment at 150° C. for 1 hour. Next, the mass W and the volume V of the thus obtained dry film were respectively measured to obtain a dry film density in accordance with the equation of W/V. Results are shown in Table 2. It is noted that the acceptable criterion of the dry film density was set to 7.50 g/cm³ or more.

Next, each of the silver paste samples was printed on a ceramic substrate by coating into a rectangular parallelepiped shape of 60 mm×0.6 mm×40 μm, the resultant was baked at 650° C. under an oxidative atmosphere (in the air) to form a conductor film, and an electrical resistance value was obtained by a four-terminal method to calculate a specific resistance. Results are shown in Table 2. It is noted that the acceptable criterion of the specific resistance was set to 2.00 μΩ·cm or less, and preferably 1.90 μΩ·cm or less.

TABLE 2

| Sample | Silver Paste Sample | Silver Powder No. | $C_{AG}$[1] (mass %) | $C_{BND}$[2] (mass %) | Dry Film Density (g/cm³) | $C_{BND}/S_{BET}$ | Specific Resistance (μΩ·cm) |
|---|---|---|---|---|---|---|---|
| Example 1 | a | 1 | 95.23 | 0.525 | 7.87 | 2.63 | 1.80 |
| Example 2 | b | 2 | 95.25 | 0.525 | 7.89 | 2.76 | 1.81 |
| Example 3 | c | 3 | 95.03 | 0.525 | 7.55 | 3.09 | 1.91 |
| Example 4 | d | 4 | 95.15 | 0.525 | 7.90 | 2.76 | 1.87 |
| Example 5 | e | 5 | 94.84 | 0.525 | 7.85 | 2.10 | 1.85 |
| Example 6 | f | 6 | 94.80 | 0.450 | 7.75 | 3.21 | 1.92 |
| Example 7 | g | 7 | 94.76 | 0.480 | 7.60 | 2.40 | 1.92 |
| Example 8 | h | 8 | 94.90 | 0.500 | 7.70 | 2.78 | 1.93 |
| Example 9 | i | 9 | 94.59 | 0.700 | 7.80 | 3.18 | 1.82 |
| Example 10 | j | 10 | 94.80 | 0.600 | 7.56 | 2.22 | 1.89 |
| Example 11 | k | 11 | 95.30 | 0.525 | 8.04 | 2.28 | 1.84 |
| Example 12 | l | 12 | 95.13 | 0.525 | 8.07 | 2.63 | 1.85 |
| Comparative Example 1 | m | 13 | 94.41 | 0.525 | 6.87 | 4.38 | 2.30 |
| Comparative Example 2 | n | 14 | 94.00 | 0.480 | 7.10 | 2.40 | 2.10 |
| Comparative Example 3 | o | 15 | 95.15 | 0.525 | 7.65 | 3.28 | 1.91 |

TABLE 2-continued

| Sample | Silver Paste Sample | Silver Powder No. | $C_{AG}$[1] (mass %) | $C_{BND}$[2] (mass %) | Dry Film Density (g/cm³) | $C_{BND}/S_{BET}$ | Specific Resistance (μΩ · cm) |
|---|---|---|---|---|---|---|---|
| Comparative Example 4 | p | 16 | 94.38 | 0.420 | 7.40 | 1.27 | 2.05 |
| Comparative Example 5 | q | 17 | 95.08 | 0.420 | 7.30 | 1.35 | 2.09 |
| Comparative Example 6 | r | 18 | 94.31 | 0.780 | 8.02 | 3.55 | 1.91 |
| Comparative Example 7 | s | 19 | 91.83 | 0.990 | 7.50 | 5.82 | 1.94 |
| Comparative Example 8 | t | 20 | 94.61 | 0.420 | 7.85 | 1.91 | 1.93 |
| Comparative Example 9 | u | 21 | 94.62 | 0.760 | 7.16 | 1.90 | 2.10 |
| Example 13 | v | 22 | 95.50 | 0.525 | 7.65 | 2.63 | 1.89 |

[1] Content of silver powder in silver paste: (silver powder/silver paste) × 100
[2] Content of ethyl cellulose in silver powder: (ethyl cellulose/silver powder) × 100

Examples 14 to 26 and Comparative Examples 10 to 18

On a magnetic layer having a thickness of 30 μm precedently prepared, a rectangular parallelepiped pattern was formed by a screen printing method with each of the silver paste samples a to u obtained as described above, and a magnetic layer was further printed thereon to fill a level difference caused by the thickness of the pattern. Assuming that the resultant was one set, three sets were stacked on one another, and covering magnetic layers were further stacked respectively on uppermost and lowermost portions. Next, the resultant was subjected to thermocompression bonding, was degreased under an oxidative atmosphere, and was baked at 650° C. to obtain a laminate.

Next, the thus obtained laminate was used to evaluate printability. Specifically, the laminate was cut as illustrated in FIG. 4, and the rectangularity of the cross-sections of conductor films was observed to measure an average of angles shown as θ in FIG. 4. Results are shown in Table 3. It is noted that the acceptable criterion of the printability was set to 55° or more, and preferably 65° or more.

Besides, twenty-five laminates were produced in the same manner as described above, and short circuit ratios of the laminates were measured. Specifically, electrical resistance between the upper most layer and the middle layer, and between the middle layer and the lower most layer in the three conductor films of each laminate was measured, and this measurement was performed repeatedly on the prepared twenty-five laminates. A ratio of the number of times of electrical conduction out of the total number of times of the measurement was defined as a short circuit ratio. Results are shown in Table 3. It is noted that the acceptable criterion of the short circuit ratio was set to 5% or less, and preferably 3% or less.

TABLE 3

| Sample | Laminate | Silver Paste Sample | Rectangularity θ (°) | Short Circuit Ratio (%) |
|---|---|---|---|---|
| Example 14 | A | a | 65 | 0% |
| Example 15 | B | b | 65 | 0% |
| Example 16 | C | c | 70 | 2% |
| Example 17 | D | d | 60 | 2% |
| Example 18 | E | e | 65 | 2% |
| Example 19 | F | f | 65 | 0% |
| Example 20 | G | g | 60 | 0% |
| Example 21 | H | h | 65 | 0% |
| Example 22 | I | i | 60 | 0% |
| Example 23 | J | j | 60 | 0% |
| Example 24 | K | k | 65 | 4% |
| Example 25 | L | l | 61 | 4% |
| Comparative Example 10 | M | m | 72 | 16% |
| Comparative Example 11 | N | n | 55 | 0% |
| Comparative Example 12 | O | o | 58 | 86% |
| Comparative Example 13 | P | p | 50 | 0% |
| Comparative Example 14 | Q | q | 50 | 0% |
| Comparative Example 15 | R | r | 48 | 30% |
| Comparative Example 16 | S | s | 45 | 0% |
| Comparative Example 17 | T | t | 50 | 0% |
| Comparative Example 18 | U | u | 65 | 60% |
| Example 26 | V | v | 65 | 0% |

The invention claimed is:

1. A silver paste comprising:
   a spherical silver powder having an aspect ratio in a range of 1.0 to 1.5;
   a binder resin; and
   an organic solvent,
   wherein a content $C_{AG}$ of the silver powder relative to the silver paste is 92.00 to 97.00% by mass,
   wherein a value $C_{BND}/S_{BET}$ is 2.00 to 3.40, where $S_{BET}$ (m²/g) represents a specific surface area of the silver powder, and $C_{BND}$ in percent by mass represents a content of the binder resin relative to the silver powder,
   wherein a copper content of the silver powder is within a range of 10 to 5000 ppm by mass, and
   wherein the silver paste has a dry film density of 7.50 g/cm³ or more.

2. The silver paste according to claim 1, wherein the dry film density is 7.60 g/cm³ or more.

3. The silver paste according to claim 1 or 2, wherein the value $C_{BND}/S_{BET}$ is 2.50 to 3.10.

4. The silver paste according to claim 1, wherein the silver powder comprises copper at 30 to 500 ppm by mass.

5. The silver paste according to claim 1, wherein the content $C_{AG}$ of the silver powder relative to the silver paste is 92.00 to 96.00% by mass.

6. The silver paste according to claim 1, wherein the specific surface area $S_{BET}$ of the silver powder is 0.10 to 0.30 m²/g.

7. The silver paste according to claim 1, wherein D10 is 1.00 to 3.00 μm and D50 is 3.00 to 7.00 μm, where D10 and D50 respectively represent a 10% value and a 50% value of a volume-based cumulative fraction obtained by laser diffraction particle size distribution measurement of the silver powder.

8. The silver paste according to claim 7, wherein the D10 is 1.20 to 2.00 μm.

9. The silver paste according to claim 7 or 8, wherein the D50 is 3.90 to 5.00 μm.

10. The silver paste according to claim 1, usable for forming a conductor film by a heat treatment at 700° C. or less.

\* \* \* \* \*